United States Patent
Rimer et al.

(10) Patent No.: US 12,434,974 B2
(45) Date of Patent: Oct. 7, 2025

(54) SYNTHESIS OF FINNED ZEOLITE CRYSTALS

(71) Applicant: University of Houston System, Houston, TX (US)

(72) Inventors: Jeffrey D. Rimer, Houston, TX (US); Yufeng Shen, Columbia, MD (US); Heng Dai, Houston, TX (US)

(73) Assignee: UNIVERSITY OF HOUSTON SYSTEM, Houston, TX (US)

(*) Notice: Subject to any disclaimer, the term of this patent is extended or adjusted under 35 U.S.C. 154(b) by 547 days.

(21) Appl. No.: 17/798,748

(22) PCT Filed: Feb. 9, 2021

(86) PCT No.: PCT/US2021/017188
§ 371 (c)(1),
(2) Date: Aug. 10, 2022

(87) PCT Pub. No.: WO2021/163021
PCT Pub. Date: Aug. 19, 2021

(65) Prior Publication Data
US 2023/0077288 A1    Mar. 9, 2023

Related U.S. Application Data

(60) Provisional application No. 62/975,254, filed on Feb. 12, 2020.

(51) Int. Cl.
C01B 39/02 (2006.01)
C01B 39/40 (2006.01)
C01B 39/44 (2006.01)
C01B 39/48 (2006.01)

(52) U.S. Cl.
CPC ............ C01B 39/026 (2013.01); C01B 39/40 (2013.01); C01B 39/445 (2013.01); C01B 39/48 (2013.01); C01P 2004/90 (2013.01)

(58) Field of Classification Search
CPC ..... C01B 39/026; C01B 39/40; C01B 39/445; C01B 39/48; C01B 39/02; C01B 39/36; C01B 39/365
See application file for complete search history.

(56) References Cited

U.S. PATENT DOCUMENTS 6,160,191 A * 12/2000 Smith ............... C01B 39/04
585/475
2015/0147268 A1 5/2015 Yoon et al.
2017/0240431 A1 8/2017 Burton et al.

FOREIGN PATENT DOCUMENTS

CA  2268144  4/1998

OTHER PUBLICATIONS

Julien Grand, "Mechanism of zeolites crystal growth: new findings and open questions", Jan. 15, 2016, Royal Society of Chemistry, vol. 18, pp. 650-664 (Year: 2016).*

(Continued)

*Primary Examiner* — Anthony J Zimmer
*Assistant Examiner* — Jaanzeb C Raja
(74) *Attorney, Agent, or Firm* — Jackson Walker LLP

(57) ABSTRACT

A secondary growth procedure described herein is used to prepare finned zeolites. The finned zeolites possess properties that are distinctly unique compared to crystals of similar size lacking fins. The procedure is amenable to a wide range of zeolite crystal structures.

10 Claims, 14 Drawing Sheets

(56) References Cited

OTHER PUBLICATIONS

Notification of Transmittal of the International Search Report and the Written Opinion of the International Search Authority—The European Patent Office—mailed May 26, 2021 for PCT/US21/17188, 15 pages.

Karin Möller, et al., "Crystallization and porosity of ZSM-23", Microporous and Mesoporous Materials, vol. 143, 2011, pp. 253-262.

Notification of Transmittal of International Preliminary Report on Patentability mailed Aug. 25, 2022 from the International Bureau of WIPO for PCT/US21/17188, 8 pages.

* cited by examiner

FIG. 3 - CONT'D
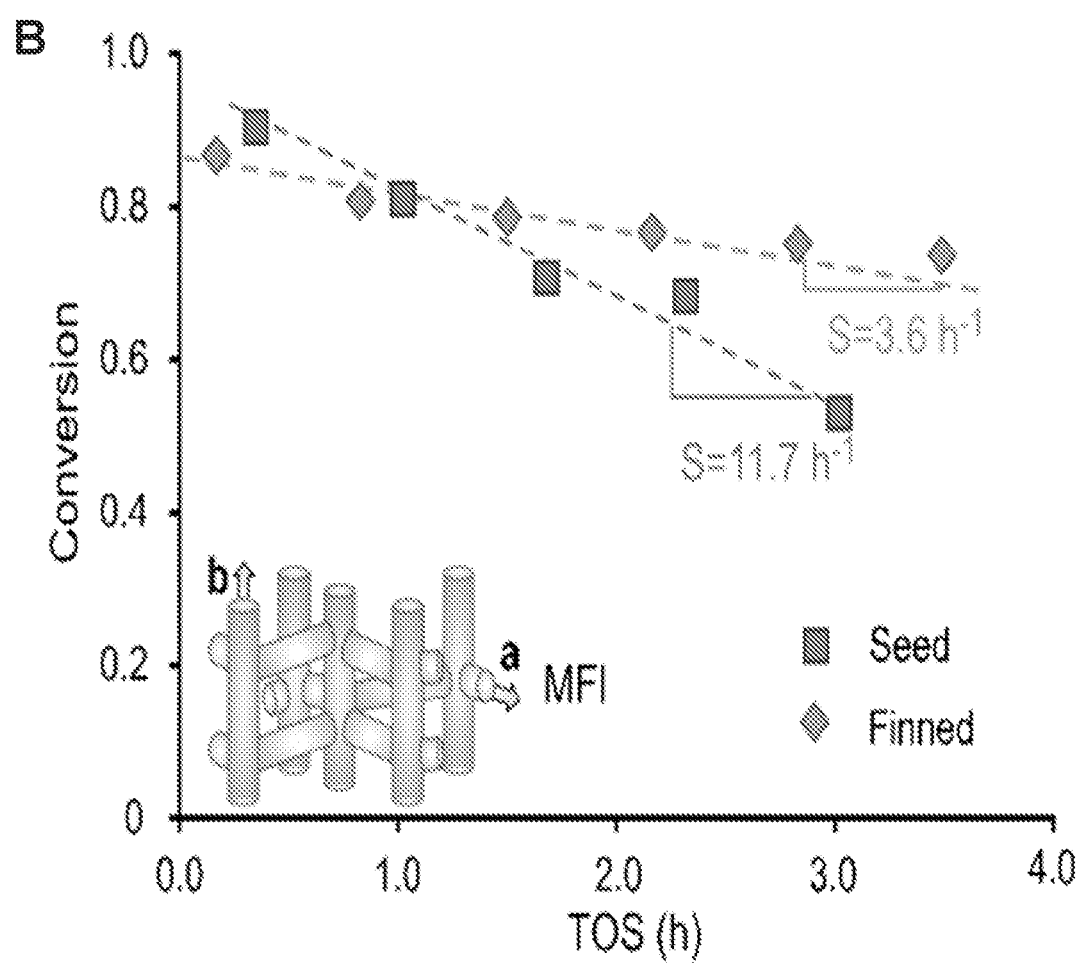

FIG. 3 - CONT'D
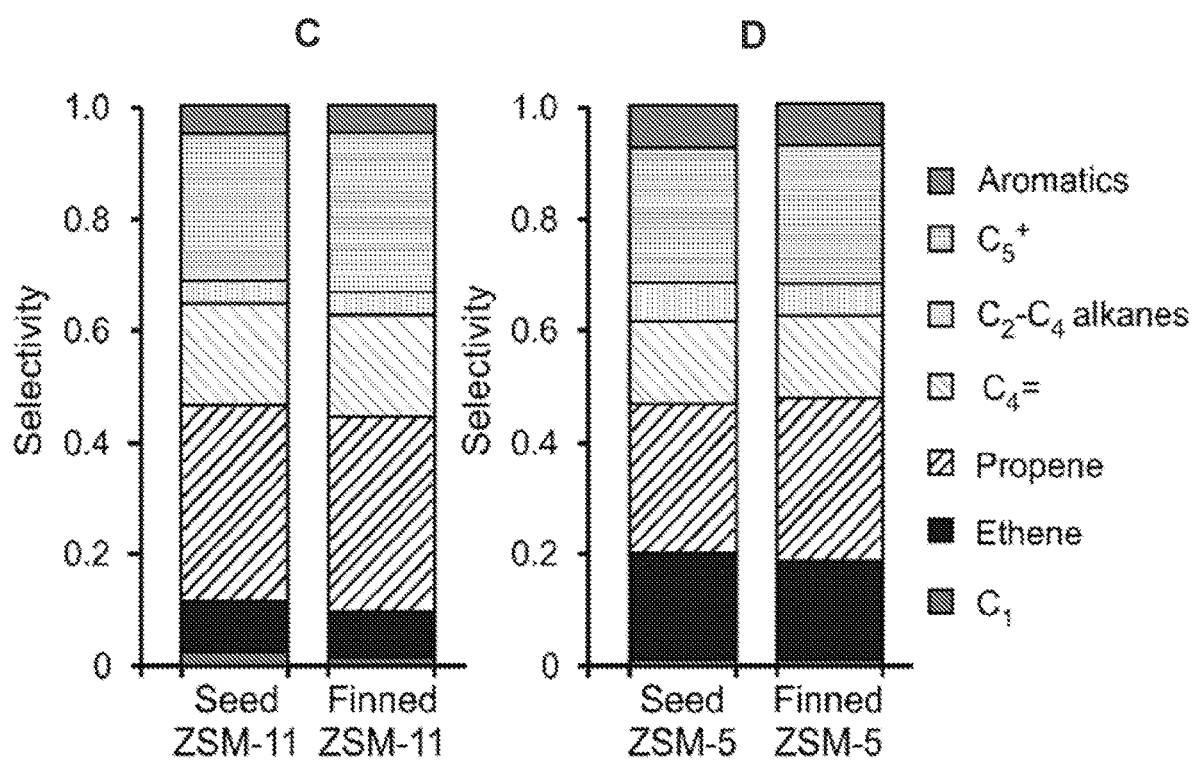

FIG. 3 - CONT'D
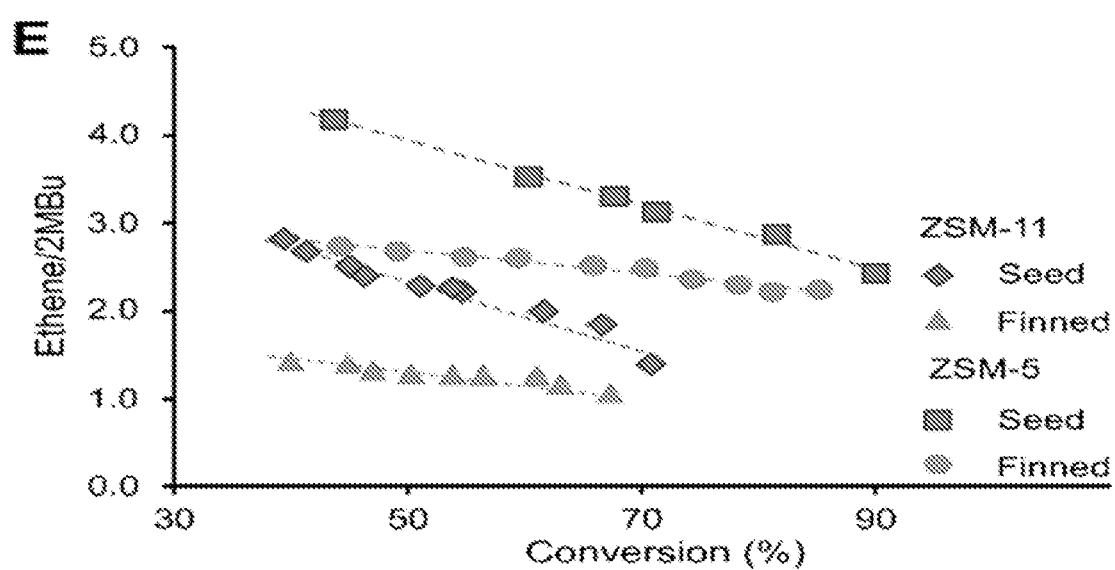

FIG. 3 - CONT'D
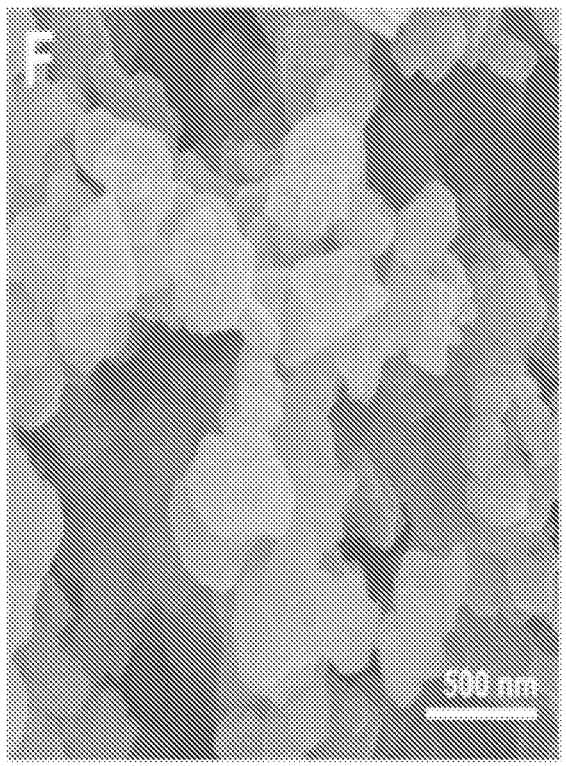
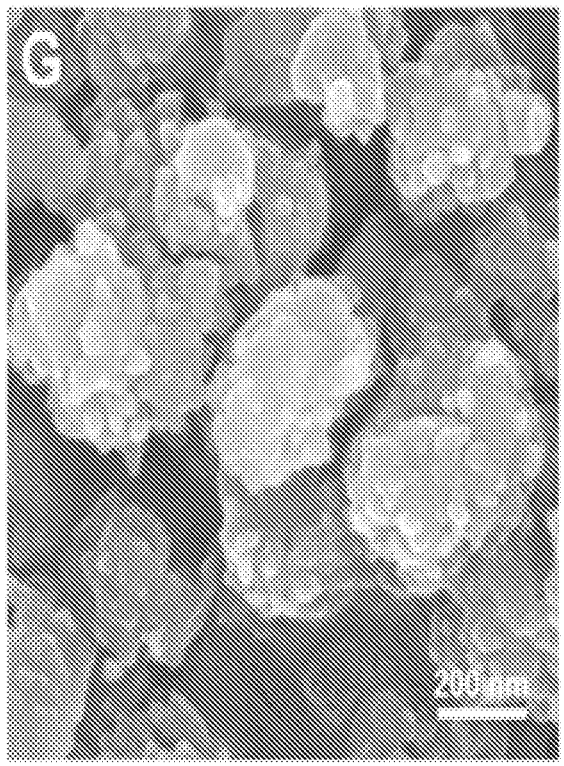

FIG. 3 - CONT'D
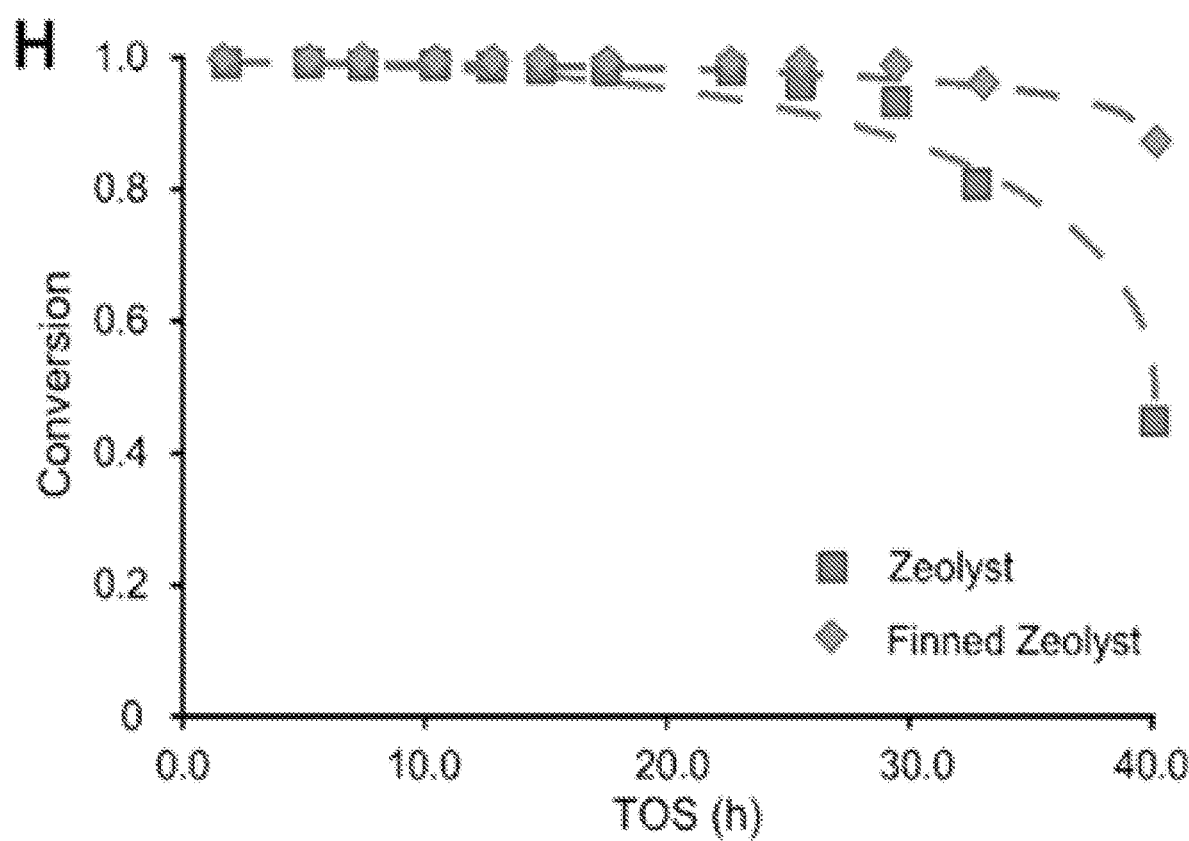

SYNTHESIS OF FINNED ZEOLITE CRYSTALS

This application claims priority to U.S. Provisional Patent Application No. 62/975,254, entitled "Synthesis of Finned Zeolite Crystals," filed Feb. 12, 2020, the entire contents of which are hereby incorporated by reference.

BACKGROUND

This invention was made with government support under grant DE-SC 0014468 awarded by the Department of Energy, Basic Energy Sciences. The government has certain rights in the invention.

This disclosure pertains to the synthesis of finned zeolite crystals.

It is well established that zeolite crystal size can impact the mass transport properties of zeolites for adsorption, separations, ion exchange, and catalysis, to name a few applications. In the case of zeolite catalysis, it is well established that smaller crystal size can improve catalyst lifetime (depending on reaction conditions), and can also influence product selectivity. Smaller dimensions lead to a reduction in the average residence time of reactants and products within the pores of the zeolite. This reduction in internal diffusion path length, for example, reduces the rate of coke formation (i.e. carbon deposits that block pores), thereby increasing the catalyst lifetime and potentially altering the number of secondary reactions taking place in the pores, which impacts selectivity.

Previously, researchers have reported relatively few of the known ca. 250 zeolites can be prepared with sizes less than 100 nm. However, syntheses of nano-sized zeolites often suffer from low yield and they typically require the use of expensive organics. All of these factors pose problems for mass production of zeolites. Moreover, 2-dimensional materials (with sizes of 2-10 nm) have only been realized for a handful of these structures and are challenging to isolate and prepare as catalyst formulations. Many conventional syntheses of zeolites ZSM-5 (MFI) and ZSM-11 (MEL) with appreciable aluminum content (i.e. Si/Al<40) rarely yield crystals with sizes less than 100 nm.

Reported methods to reduce diffusion limitations include the preparation of nano-sized (with sizes 10-100 nm) zeolites and 2-dimensional zeolites (with sizes of 2-10 nm). Achieving such small sizes is often nontrivial and can involve multi-step processes that often involve the use of organic structure-directing agents (many of which are not commercially available).

SUMMARY

The present disclosure relates generally to a post-synthetic route to make a new class of microporous materials with reduced diffusion limitations, referred to as "finned" zeolite crystals. Inspired by conventional fins which enhance interfacial heat transfer, finned zeolite crystals are comprised of a seed (with a characteristic size of $\beta$) and epitaxially grown protrusions (with a characteristic size of $\alpha$, where $\alpha<<\beta$). The growth of protrusions is accomplished by a seeding method where zeolite crystals are placed in a secondary growth solution that results in the formation of a roughened interface on the surfaces of the seeds owing to a population of fins. The growth solution and conditions of secondary synthesis were designed in such a way to minimize homogeneous nucleation of new crystals and preferentially grow fins on the crystal seeds. The conditions of secondary growth can be adjusted to vary the density (or coverage) and size of fins. This process is generalizable to a wide range of zeolite framework types. The synthesis of finned zeolites has been demonstrated on three different crystal structures: ZSM-5 (MFI), ZSM-11 (MEL), and ferrierite (FER). Both MEL and MFI frameworks are comprised of 3-dimensional intersecting medium-sized channels, whereas the FER framework is comprised of 2-dimensional intersecting small- and medium-sized channels.

The method disclosed herein relies on the post-synthesis modification of existing (seed) crystals. Fins can be generated via a one-pot process; however, the exact set of synthesis conditions is unpredictable, and is thus less generalizable to a broad set of crystal structures. The seeded growth approach is one that more reproducibly (and predictably) leads to finned materials. One of the difficulties of preparing finned zeolites is identifying growth mixtures that promote the nucleation and growth of protrusions on the surfaces of seed crystals. Systematic experiments have identified conditions that are optimal for finned zeolite formations. The conditions that can be manipulated to tailor finned zeolites include (but are not limited to) temperature, the introduction of organics, synthesis time, supersaturation (i.e. silica and/or alumina concentrations), the sources of silica and alumina, and alkalinity. For example, synthesis at high temperature may promote homogeneous nucleation of crystals that are isolated from the seed crystals, thus generating a bimodal distribution of crystal sizes (or aggregates of crystals). Conversely, synthesis at low temperature may be insufficient to nucleate fins on the surfaces of zeolite seed crystals.

The present synthetic approach produces finned zeolite crystals having an overall performance, revealed by catalytic tests, similar to crystals with smaller sizes of approximately $\alpha$ (the average dimension of finned protrusions). This indicates that the introduction of fins leads to improved catalyst properties and may also extend to other applications, such as adsorption, separations or ion exchange, where internal diffusion can impact overall properties of the zeolite.

Finned zeolites, despite having a net larger size than the seeds, behave as catalysts with sizes that are smaller than the seed. The methanol to hydrocarbons (MTH) reaction showed a nearly three-fold decrease in the rate of catalyst deactivation relative to conventional zeolite crystals. A shift was also observed in the predominant hydrocarbon pool mechanism for finned zeolites that resulted in product selectivities similar to smaller crystals. Collectively, findings indicate that this modification method enhances catalyst performance, thus offering an efficient and versatile platform to synthesize optimal zeolite catalysts with reduced diffusion limitations for diverse applications in the (petro)chemical industry. This method also allows for the modification of existing commercial catalysts through a facile secondary growth procedure.

The finned zeolites described herein possess properties that are distinctly unique compared to crystals of similar size lacking fins. The secondary growth procedure used to prepare finned zeolites is amenable to a wide range of zeolite crystal structures. There are no known existing technologies that employ seeded (or secondary) growth to achieve finned materials. Most syntheses in published literature/patents report crystals with rough features owing to the presence of aggregates, or fused crystals. In these materials, the improved performance reported in these studies is due to the bimodal distribution of small and large crystals as well as mesoporosity that is introduced via their aggregated morphology. In the present technology, the fins are epitaxially grown on the surfaces of seed crystals (meaning the fin and seed exhibit identical crystallographic registry); thus the enhanced performance is not attributed to mesoporosity. Moreover, the present technology is superior to mixtures of small and large crystals for several reasons: (1) it is challenging to prepare small crystals by conventional methods; (2) the contact between small and large crystals can lead to pore blockage which negatively impacts internal mass transport; (3) synthesis of mixtures of small and large crystals can be difficult to control in zeolite synthesis scale-up; and (4) the small crystal can be lost in some processes such as filtration and catalyst manufacturing (e.g. spray drying). In the present technology, the network of pores is continuous between the fin and seed, and thus pore blockage is avoided. It should be noted that the procedures used in this technology also bypass the need for expensive organics, thus making the present approach more economical than prior art that relies on exotic organics to generate hierarchical (or 2-dimensional) zeolitic materials.

DETAILED DESCRIPTION OF PREFERRED EMBODIMENTS

Figure 1:
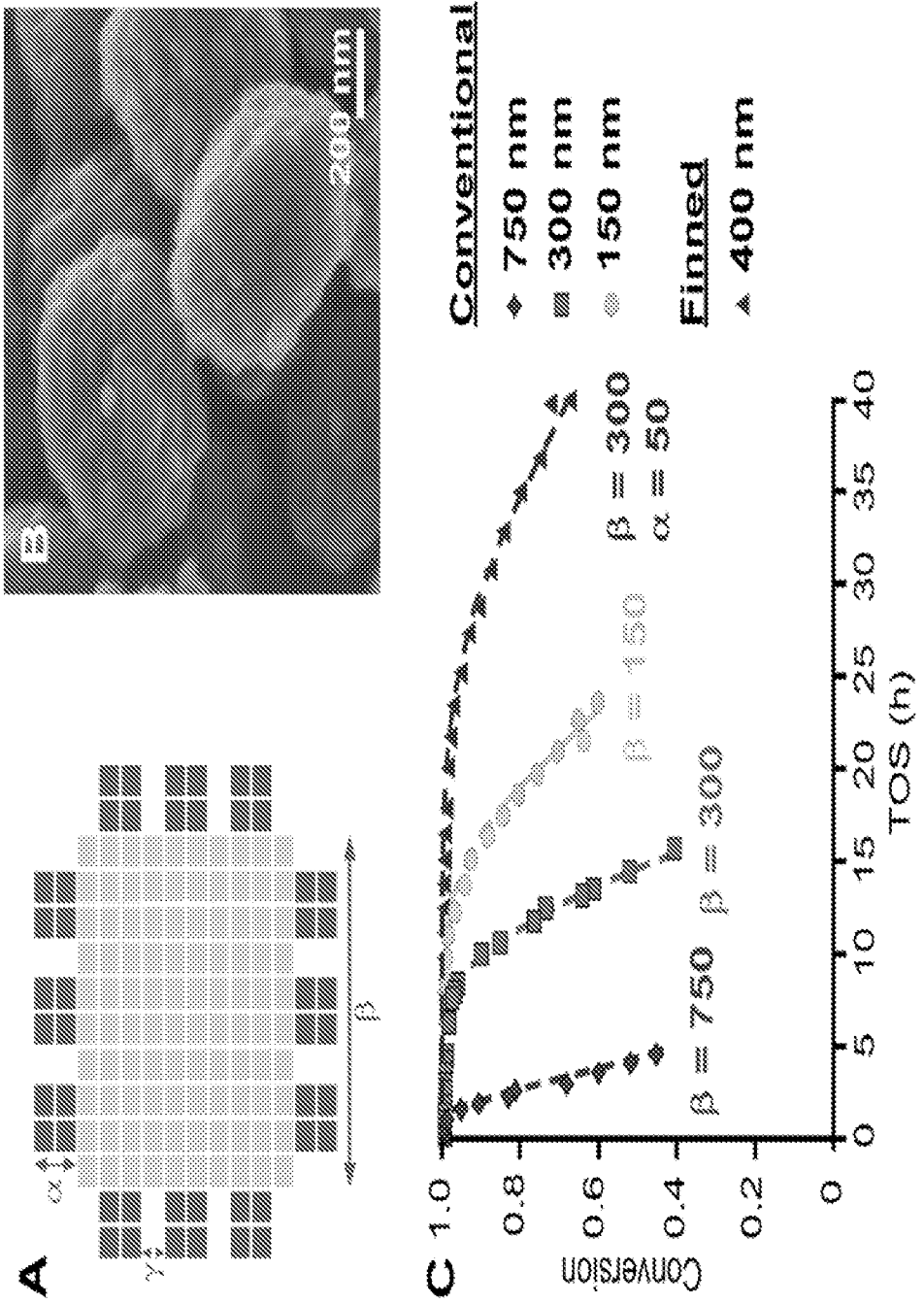
FIG. 1 shows (A) an idealized schematic of a finned zeolite with a fin dimension of α, an interior width of β, and interstitial spacing (or pitch) γ between adjacent fins, (B) a scanning electron micrograph of ZSM-11 with finned surfaces prepared from growth solution MEL-finned (Table 1), and (C) time-on-stream methanol conversion for H-ZSM-11 catalysts with different crystal sizes.

The present disclosure relates to methods for synthesizing finned zeolite crystals.

The present synthetic methods address limitations in conventional zeolite syntheses for optimizing catalyst performance using a seeded growth (or secondary growth) protocol that has the potential to enhance the performance of a given zeolite. Such processes could be used, for example, to improve the performance of zeolite catalysts for industrial applications in the petroleum and petrochemical industries. Preferred embodiments described herein include the synthesis of ZSM-5 (MFI), which is one of the most widely utilized catalysts in the petroleum industry as a heterogeneous catalyst. An additional preferred embodiment relates to synthesis of ZSM-11 (MEL), which has drawn much attention in industry due to its similar topology as MFI or ferrierite (FER).

Preferred embodiments described herein relate to a method to prepare finned zeolites where the protrusions (or fins) are of dimension α<50 nm. The performance of finned zeolite catalysts in MTH reactions suggest that they behave similarly to crystals of size a rather than the overall size of the particles (which can be ca. 400 nm). Thus, the present methods bypass the challenges of directly synthesizing nano-sized zeolites, and allow for the enhanced performance of larger crystals (including existing commercial zeolites) via a secondary growth procedure. This method is versatile in its design, allowing for fins of varying size and density (number of fins per seed external surface area) to be grown on zeolite seeds that possess a wide range of crystal structures (i.e. multiple zeolite framework types). Findings indicate that the fins improve internal mass transport properties, which opens new avenues for their use in multiple applications that include (but are not limited to) catalysis, separations, adsorption, and ion exchange.

The successful synthesis of finned zeolites for 2- and 3-dimensional structures is described herein, but the approach is generalizable to a broad class of zeolitic materials.

Preferred embodiments described herein pertain to a method of preparing finned zeolite crystals comprising a step of preparing a secondary growth solution for the epitaxial growth of finned protrusions from zeolite seed crystals. In preferred embodiments, the secondary growth solution comprises one or more framework source precursors, one or more structure-directing agents, and a hydroxide source. An additional step in preferred embodiments of the method is adding zeolite seed crystals in an amount of about 5 to about 30 weight percent of the secondary growth solution, to produce a seeded growth solution. An additional step in preferred embodiments of the method is heating the seeded growth solution to a temperature of about 100° C. to about 170° C. for about 6 to about 48 hours. Additional steps in preferred embodiments of the method include quenching the seeded growth solution to room temperature to produce a final growth solution and isolating finned zeolite crystals from the final growth solution.

In further preferred embodiments of the method, the one or more framework precursors comprise one or both of a silica source and an alumina source. In additional preferred embodiments of the method, the one or more framework precursors comprise sodium silicate, tetraethylorthosilicate, colloidal silicate, fumed silica, $SiO_2$, aluminum sulfate, aluminum hydroxide, $Al_2O_3$, or combinations thereof. In further preferred embodiments, the one or more structure-directing agents are inorganic, organic, or a combination thereof. A first structure-directing agent may be the same or different from a second structure-directing agent. In further preferred embodiments, the structure-directing agents (SDAs) are selected from pyrrolidine, tetrapropylammonium hydroxide, 1,8-diaminooctane, cyclohexylamine and tetrabutylammonium hydroxide. In further preferred embodiments, the hydroxide source is $Na_2O$ or $K_2O$. In additional preferred embodiments of the method, the secondary growth solution has a molar composition ratio of about 40:1 to about 120:1 of one framework source precursor to another framework source precursor, which may be about 40:1 to about 120:1 $SiO_2/Al_2O_3$. In additional preferred embodiments of the method, the secondary growth solution has a molar composition ratio of about 2:1 to about 15:1 of a framework source precursor, which may be $SiO_2$, to the structure directing agent. In additional preferred embodiments of the method, the secondary growth solution has a molar composition ratio of about 8:1 to about 65:1 of a framework source precursor, which may be $SiO_2$, to the hydroxide source. Additional preferred embodiments include the finned zeolite crystals prepared by the method. In preferred embodiments, the finned zeolite crystals are MEL type, MFI type, or FER type.

Further preferred embodiments described herein include finned zeolite crystals, comprising a zeolite seed crystal portion and a plurality of epitaxially grown protrusions, or fins, extending from outer surfaces of the zeolite seed crystal portion. The zeolite seed crystal portion comprises a single crystallographic registry and a network of pores. The epitaxially grown protrusions comprise an identical crystallographic registry to that of the zeolite seed crystal portion as a result of the epitaxial growth. The epitaxially grown protrusions also comprise a network of pores that is continuous with the network of pores of the seed portion as a result of the epitaxial growth. In additional preferred embodiments of the finned zeolite crystals, the zeolite seed crystal portion has a characteristic size of $\beta$, the epitaxially grown protrusions have a characteristic size of $\alpha$, and $\beta$ is greater than $\alpha$. In further preferred embodiments, $\alpha$ is less than about 50 nm. In additional preferred embodiments, the average pitch $\delta$ (or interstitial spacing) between adjacent fins is about 20 nm to about 100 nm. In additional preferred embodiments the finned zeolite crystals are MEL type, MFI type, or FER type.

The growth solutions selected for MFI, MEL, and FER capitalize on the fact that zeolites tend to grow by nonclassical pathways involving the attachment of amorphous precursors or species more complex than a monomer of the framework source precursors. This enables 3-dimensional growth of fins on seed crystal surfaces. The protocol for generating finned zeolites was strategically selected by adjusting the supersaturation to a level that was sufficiently high to avoid the growth by monomer addition, which can lead to a smooth overgrowth of the seed crystal (or 2-dimensional growth). At the same time, there is an upper limit of supersaturation that, when exceeded, can lead to homogeneous nucleation of new crystals in the growth solution, thereby generating aggregates of both small and large crystallites. Given that many zeolites are prepared from solutions of similar compositions and the existence of diverse precursors, it is anticipated that this approach is generalizable to a broad class of zeolite framework types.

EXAMPLE 1

This example investigates an alternative method to reduce the internal diffusion limitations of zeolite catalysts, focusing on two common 3-dimensional medium-pore zeolites: ZSM-11 (MEL type) and ZSM-5 (MFI type).

All reagents were used directly without further purification. Zeolite synthesis was performed with the following reagents: tetraethylorthosilicate (TEOS, 98%, Sigma Aldrich), Ludox AS-30, NaOH, KOH, 1,8-diaminooctane (DAO, 98%, Sigma Aldrich), $Al_2(SO_4)_3$, sodium aluminate (technical grade, Alfa Aesar), sodium hydroxide (>98%, Sigma-Aldrich), tetrabutylammonium hydroxide (TBAOH, 40%, Sigma-Aldrich), and tetrapropylammonium hydroxide (TPAOH, 40%, Alfa Aesar). Deionized (DI) water, used in all experiments, was purified with an Aqua Solutions Type I RODI filtration system (18.2 MΩ). The 1.0 M ammonium nitrate solution used in ion exchange was made from ammonium nitrate salt ($NH_4NO_3$, ACS reagent, >98%, Sigma-Aldrich) and DI water. For reaction testing, the zeolite catalysts were pelletized and sieved (40-60 mesh size), and 36.9 mg of sieved catalyst pellets was diluted with 113.1 mg of silica gel (Davisol grade 636, 35-60 mesh particle size, Sigma-Aldrich).

For the synthesis of conventional ZSM-11 zeolite, using a non-seeded (or one pot) method for synthesis of finned zeolites for comparison purposes, TBAOH was used as the organic structure-directing agent (OSDA). In a typical synthesis, 0.220 g of sodium aluminate was added to a mixture of 0.786 g of NaOH solution (43 mg/g of solution) and 5.36 g of DI $H_2O$. To this solution was added 5.925 g of TBAOH, followed by the silica source, TEOS (9.707 g). The resulting mixture was stirred at room temperature in a sealed bottle for 2 h to allow for the hydrolysis of TEOS. The resulting solution was placed in a 60 mL Teflon liner within a metal autoclave (Parr Instruments) that was sealed and heated in a Thermo Fisher Precision oven at temperatures T=170° C. and autogenous pressures. The autoclave was removed from the oven after 3 days and was quenched in water to room temperature. The molar compositions of synthesis mixtures listed in Table 1 below were varied to synthesize conventional and one-pot finned ZSM-11/ZSM-5 samples. The synthesis procedure for ZSM-5 samples was identical to that of ZSM-11, with the exception that TPAOH was used as the OSDA. The crystalline product was removed from the mother liquor by three cycles of centrifugation and washes with DI water, using a Beckman Coulter Avanti J-E centrifuge at 5° C. and 13000 rpm for 10 min per cycle. Samples for catalysis were calcined in a Thermo Fisher Lindberg Blue furnace under constant flow of dried air (Matheson Tri-Gas) at 550° C. for 5 h with a temperature ramping/cooling rate of 1° C/min. These samples were converted to an acid form (Brnsted acids) by ion exchange wherein calcined zeolite was mixed with 1.0 M ammonium nitrate solution to obtain a 2 wt % suspension. This mixture was heated to 80° C. for 2 h to allow the exchange of $Na^+$ with $NH_4^+$. This process was performed three times with washing between each ion exchange cycle. The final $NH_4$-zeolite samples were washed thrice with DI water before they were calcined once again with the same procedure stated above to generate H-form zeolites.

TABLE 1

Synthesis conditions for conventional and finned zeolite ZSM-11 samples by one-pot synthesis.

| Sample | Size (nm) | Molar Composition of Growth Mixture | | | | | T (° C.) | Time (day) |
|---|---|---|---|---|---|---|---|---|
| | | $Al_2O_3$ | $SiO_2$ | $Na_2O$ | $H_2O$ | TBAOH | | |
| MEL | 750 | 2.5 | 100 | 4 | 2000 | 20 | 160 | 1 |
| MEL | 300 | 2.5 | 100 | 4 | 1000 | 20 | 170 | 3 |
| MEL | 150 | 2.5 | 100 | 4 | 600 | 20 | 170 | 3 |
| MEL (finned) | 460 | 2.5 | 100 | 4 | 3000 | 20 | 160 | 1 |

The ZSM-11 sample used as seeds was prepared with a molar composition of 10 DAO: 10 $K_2O$:100 $SiO_2$:1 $Al_2O_3$: 4000 $H_2O$. In a typical synthesis, 0.185 g of aluminum sulfate, $Al2(SO_4)_3$, was added to a mixture of 0.61 g of potassium hydroxide solution (KOH, 50 wt %) and 15.35 g of deionized (DI) $H_2O$. To this solution was added 0.40 g 1,8-diaminooctane (DAO), followed by 5.45 g colloidal silica (LUDOX AS-30) and 2 wt % calcined ZSM-11 according to procedures outlined previously (Y. F. Shen, T. T. Le, R. Li, J. D. Rimer, Optimized synthesis of ZSM-11 catalysts using 1,8-diaminooctane as a structure-directing agent. ChemPhysChem 19, 529-537, 2018, incorporated by reference herein). The resulting mixture was stirred at room temperature for 24 h. The sol gel was then placed in a 60 mL Teflon-lined acid digestion bomb and heated in an oven at 160° C. and autogenous pressure for 3 days. The solids were isolated by multiple centrifuge/washing cycles and the resulting seeds were immediately stored in DI water without allowing time for the solids to dry. A seeded growth solution was made with a molar composition of 27.3 DAO: 11.9 $K_2O$: 90 $SiO_2$: 0.5 $Al_2O_3$: 3588 $H_2O$. The solution was prepared by adding an appropriate amount of $Al_2(SO_4)_3$ to a solution containing KOH and DI water, followed by the addition of DAO and LUDOX AS-30. The mixture was stirred at room temperature for 24 h prior to adding 10 wt % ZSM-11 seeds (relative to the total amount of growth solution). The suspension was heated for 2 days at 120° C. The solids were extracted from the mother liquor using multiple centrifuge/washing cycles. The ZSM-5 sample used as seeds was prepared with a molar composition of 15 TPAOH: 4 $Na_2O$:100 $SiO_2$:1.67 $Al_2O_3$:2500 $H_2O$: 400 EtOH. In a typical synthesis, 0.094 g of sodium aluminate was added to a mixture of 1.022 g of sodium hydroxide solution (NaOH, 46 mg/g of solution) and 12.17 g of DI $H_2O$. To this solution was added 6.41 g tetraethylorthosilicate (TEOS), followed by the OSDA, tetrapropylammonium hydroxide (TPAOH, 2.30 g). The resulting mixture was stirred at room temperature for 2 h prior to heating the sol gel in an oven at T=170° C. and autogenous pressure for 2 days. The isolated seeds were immediately placed in DI water for storage. A solution for seeded growth was prepared using a molar composition of 10 TPAOH: 0.5 $Na_2O$:31.5 $SiO_2$:0.5 $Al_2O_3$:1660 $H_2O$. The solution was prepared similar to the protocol for seeds with the addition of 5 wt % ZSM-5 seeds (relative to the total amount of growth solution) after aging the secondary growth solution. The mixture was heated for 24 h at 100° C. and the solids were extracted as a white powder. Select procedures used an additional thermal annealing step where the gel after centrifugation was directly transferred to a solution with composition 10 TEOS: 14 TPAOH: 9500 $H_2O$, which was heated at 170° C. for 7 days. The solution was then removed from the oven and the solid was dried in air after multiple centrifugation and washing cycles. The molar compositions of synthesis mixtures listed in Table 2 below were varied to synthesize seeds and seed-assisted finned ZSM-11/ZSM-5 samples.

TABLE 2

Synthesis conditions for seeds and growth solutions for finned ZSM-11 and ZSM-5 samples prepared by seeded synthesis.

| Sample | Molar Composition of Growth Mixture | | | | | T (° C.) | Time (day) |
|---|---|---|---|---|---|---|---|
| | $Al_2O_3$ | $SiO_2$ | $M_2O$ [a] | $H_2O$ | OSDA [b] | | |
| MEL-Seed [c] | 1 | 100 | 10 | 4000 | 10 | 160 | 3 |
| MEL-Finned | 1 | 90 | 11.9 | 3588 | 27.3 | 120 | 2 |
| MFI-Seed | 1.67 | 100 | 4 | 2500 | 15 | 170 | 2 |
| MFI-Finned | 1 | 63 | 1 | 3320 | 20 | 100 | 1 |

[a] "M" = alkali ion; $Na_2O$ is used for ZSM-5 and $K_2O$ is used for ZSM-11, respectively;
[b] TPAOH is used for ZSM-5 and DAO is used for ZSM-11; [c] Using 2 wt % ZSM-11 calcined seed (relative to the $SiO_2$ content in the synthesis mixture).

H-form zeolites were characterized by powder X-ray diffraction (XRD) using a Rigaku SmartLab Diffractometer with Cu Kα radiation to verify the crystalline structure. Powder XRD patterns were compared to simulated patterns of each framework type provided by the International Zeolite Association Structure Database. The average crystal size was measured from scanning electron microscopy (SEM) images taken on a FEI 235 dual-beam (focused ion-beam) instrument. Elemental analysis of H-form zeolites was performed to confirm completion of ion exchange and to quantify the molar Si/Al ratio by inductively coupled plasma (ICP) analysis using a JEOL SM-31010/METEK EDAX system at 15 kV and 15 mm working distance. To confirm the uniform Al distribution in the crystal, surface elemental analysis was performed with X-ray photoelectron spectroscopy (XPS) using a PHI 5800 ESCA (Physical Electronics) system, which is equipped with a standard achromatic Al Kα X-ray source (1486.6 eV) operating at 300 W (15 kV and 20 mA) and a concentric hemispherical analyzer. Since zeolites are insulating materials, the equipment neutralizer component was utilized to prevent charging effects. All data was collected at a 45° takeoff angle, and collected spectra were analyzed using the MultiPak program. Textural analysis of H-form samples was performed to obtain the BET surface area using $N_2$ adsorption with a Micromeritics ASAP 2020 instrument, and microporous volume was determined from the t-plot method.

Figure 2:
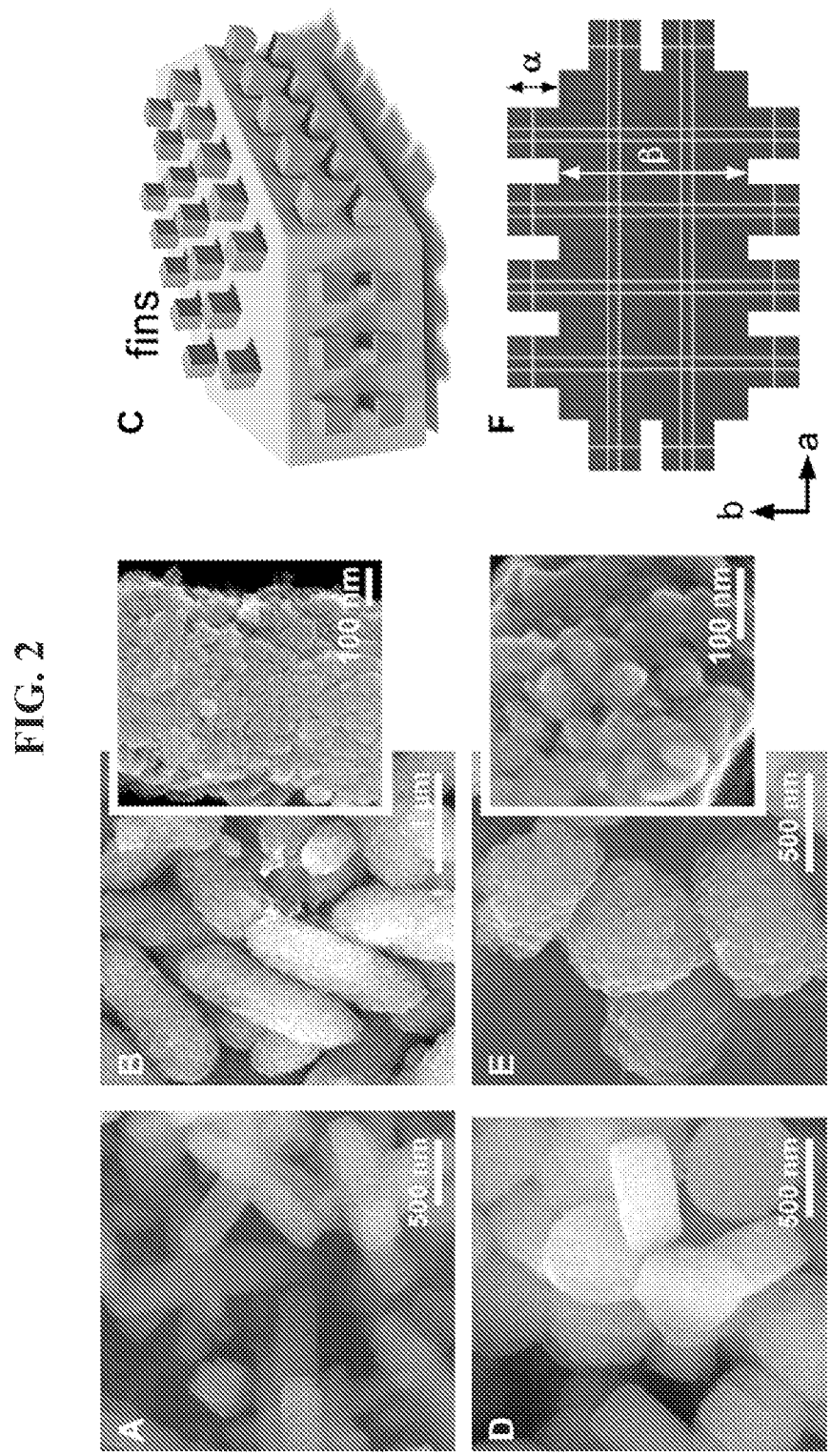
FIG. 2 shows (A) scanning electron microscopy (SEM) image of ZSM-11 crystals (seeds), (B) SEM image after secondary growth of ZSM-11 to produce fins, (C) idealized schematic of a finned zeolite where the fins have the same crystallographic registry as the seed, (D) SEM image of ZSM-5 crystals (seeds), (E) SEM image after secondary growth of ZSM-5 to produce fins, and (F) illustration of a finned zeolite comprised of continuous channels throughout the seed (with characteristic size β) and fins (with characteristic size α).

The synthesis of ZSM-11 using conventional protocols yields crystals with relatively smooth exterior surfaces. FIG. 2A shows a scanning electron micrograph of ZSM-11 with smooth surfaces prepared from a conventional protocol. An alternative one-pot synthesis of ZSM-11 produces crystals with highly roughed exterior surfaces. FIG. 1B shows a scanning electron micrograph of ZSM-11 with finned surfaces prepared from a non-seeded growth solution with molar composition of 10 DAO: 10 $K_2O$:100 SiO2:1 $Al_2O_3$: 4000 $H_2O$. FIG. 2B shows a scanning electron micrograph of a representative finned ZSM-11 crystal prepared from seeded growth. Transmission electron microscopy (TEM) reveals that these are single crystals with an identical registry between the center of the particle and its exterior rough features where the rough features are aligned in the same directions with an average dimension of 30 nm.

Elemental analysis reveals approximately similar compositions of both seed and fin with no evidence of aluminum zoning. Moreover, textural analysis shows no evidence of mesoporosity in ZSM-11 samples.

Prior studies have reported rough crystals of ZSM-11 and ZSM-5; however, these structures are distinctly different from those reported here. Notably, rough crystals in literature are commonly aggregates with small crystallites arranged in random orientations on the exterior surfaces of larger particles. This architecture gives rise to misoriented domains that can block pores at the interfacial boundaries between adjacent particles, and also produces interparticle mesoporosity. Prior studies have demonstrated that these aggregated structures enhance catalytic performance relative to conventional analogues, which is most commonly attributed to the introduction of interstitial mesopores. As shown herein, the synthesis of finned ZSM-11 yields improved catalytic properties owing to a different mechanism enhanced mass transport within the smaller domains (i.e. fins) decorating exterior surfaces. Trends in catalyst lifetime and selectivity were previously reported as a function of H-ZSM-11 crystal size (150, 300, and 750 nm) using the methanol-to-hydrocarbons (MTH) reaction. The profiles of these three catalysts (Si/Al~20) were compared to the finned H-ZSM-11 sample, which has an overall size of ca. 400 nm with average fin sizes of ca. 30 nm.

Methanol conversion over H-form catalysts was carried out in a ¼ in. stainless steel tube installed in a Thermo Scientific Lindberg Blue M furnace. The catalyst bed was supported between two plugs of quartz wool, and a K-type thermocouple (Omega Engineering) was inserted into the stainless tube to measure the temperature of the catalyst bed. Prior to the reaction, the catalyst bed was pretreated in situ at 550° C. for 3h under flow of dried air (6 cm$^3$/min of $O_2$, 24 cm$^3$/min of $N_2$). After this pretreatment, the catalyst bed was cooled down to the reaction temperature, i.e., 350° C. Methanol was fed by a syringe pump (Harvard Apparatus) at 7 µL/min into a heated inert gas stream of Ar (30 cm$^3$/min), which resulted in a reactant flow with a weight hourly space velocity (WHSV) of 9 h$^{-1}$. To kinetically compare the deactivation rate of the catalysts, reactions were also performed at low methanol conversions (X) defined as $$X = \left[1 - \left(\frac{C_{eff}}{C_{feed}}\right)\right] \times 100\%$$

where $C_{eff}$ is the carbon-based molar concentration of both methanol and dimethyl ether (DME) in the effluent and $C_{feed}$ is the concentration of methanol in the feed. The selectivity ($S_i$) of hydrocarbon product i is defined as $$S_i = \left(\frac{C_i}{C_{t,eff}}\right) \times 100\%$$

where $C_i$ is the carbon-based molar concentration of hydrocarbon i in the effluent and $C_{t,eff}$ is the total carbon-based molar concentration of hydrocarbons in the effluent.

FIG. 1C shows time-on-stream methanol conversion for H-ZSM-11 catalysts during the MTH reaction at 350° C. with WHSV=9 h$^{-1}$. The performance of finned H-ZSM-11 with an overall size of 400 nm (fins~30-50 nm) is compared to smooth H-ZSM-11 crystals with sizes of 750 nm (diamonds), 300 nm (squares), and 150 nm (circles). Dashed lines are interpolations to guide the eye. Interestingly, the finned sample deviates from the trend of increasing lifetime with decreasing crystal size when compared on the basis of its overall particle dimension; however, the trend is consistent if the finned sample behaves as though it is a crystal of much smaller size.

The preparation of finned crystals via a one-pot synthesis is arbitrary and difficult to predict owing to the largely unknown impact of synthesis parameters on zeolite crystallization. To this end, secondary (or seeded) growth offers a more controlled method of creating fins on the exterior surfaces of seed crystals. The secondary growth method was demonstrated for both ZSM-11 and ZSM-5.

FIGS. 2A and 2D show scanning electron microscopy (SEM) images of ZSM-11 and ZSM-5 crystals (seeds), respectively, prepared by conventional protocols. These images of ZSM-11 and ZSM-5 seeds reveal exterior crystal surfaces devoid of rough features. FIGS. 2B and 2E show SEM images after secondary growth of ZSM-11 and ZSM-5, respectively, confirming the presence of fins. As-synthesized zeolites were also characterized by powder X-ray diffraction (XRD) to verify the crystalline structure against simulated patterns. Comparison of samples before and after seeded growth by textural analysis shows a slight increase in total surface area (ca. 8%) with secondary growth without an appreciable change in micropore volume. Elemental analysis also confirmed that the Si/Al molar ratio of the samples before and after seeded growth are nearly identical.

The protocol for generating fins was strategically selected by adjusting the supersaturation to a level that was sufficiently high to avoid the growth of core-shell particles (i.e. layered overgrowth of the seed crystal resulting in smooth interfaces). However, there is an upper limit of supersaturation that, when exceeded, leads to homogeneous nucleation of new crystals in the growth solution, thereby generating aggregates of both small and large crystallites. FIG. 2C shows an idealized schematic of a finned zeolite where the fins have the same crystallographic registry as the seed. FIG. 2F shows an idealized schematic of a finned zeolite comprised of continuous channels throughout the seed (with characteristic size β) and fins (with characteristic size α), with channels connected throughout the interior and exterior with equal registry.

Figure 3:
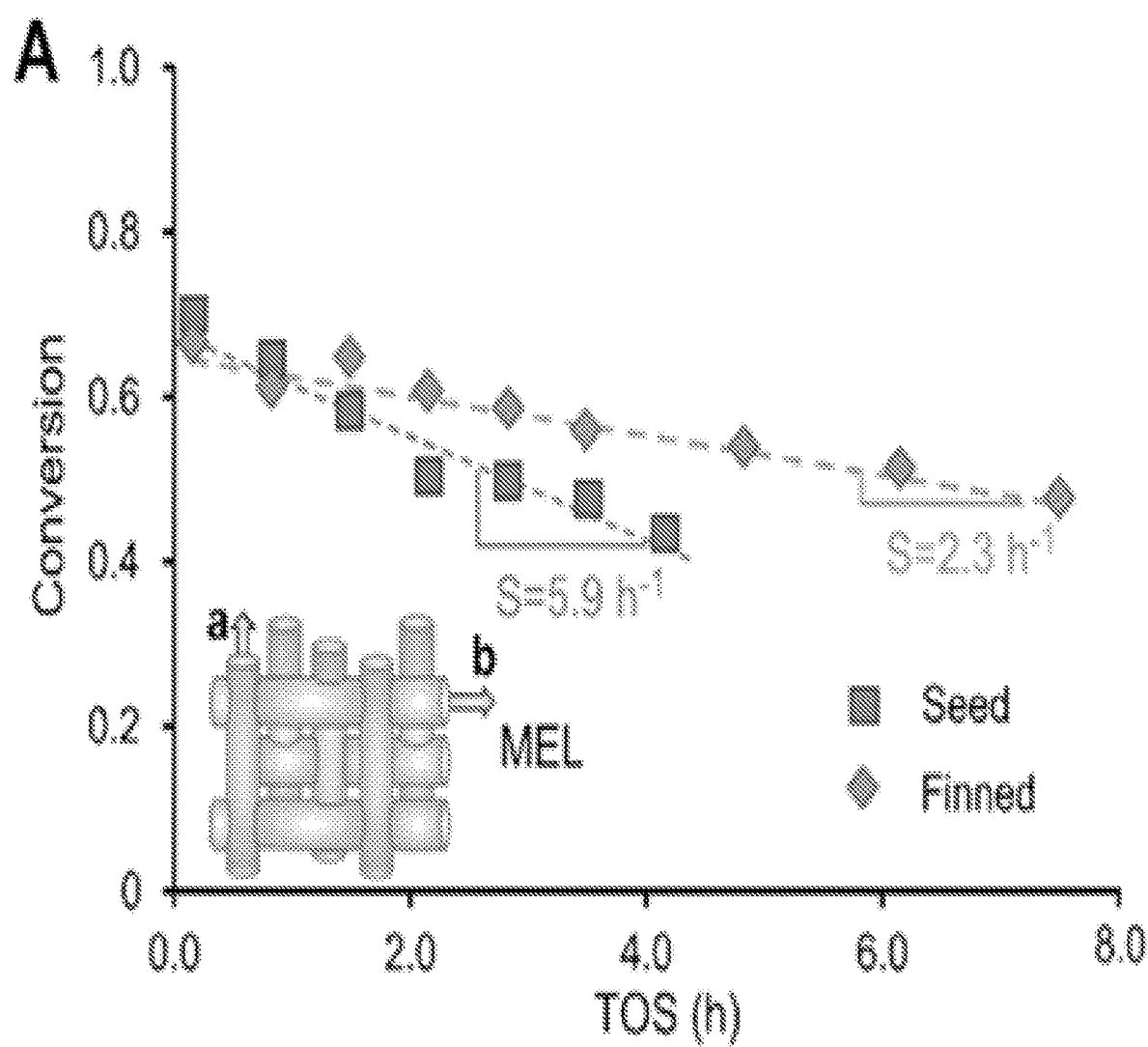
FIG. 3 shows (A) time-on-stream plot of sub-complete methanol conversion during the methanol to hydrocarbon reaction over H-ZSM-11 catalysts (seed/finned), (B) time-on-stream plot of sub-complete methanol conversion for H-ZSM-5 catalysts (seed/finned), (C) selectivities of hydrocarbon products for seed and finned H-ZSM-11 samples, (D) selectivities of hydrocarbon products for seed and finned H-ZSM-5 samples, (E) ratio of ethylene to 2-methylbutane and 2-methyl-2-butene products (2MBu) for the four sets of samples as a function of time on stream (TOS), (F) SEM image of a commercial sample, (G) SEM image of the corresponding finned commercial sample prepared by secondary growth, and (H) methanol conversion over as-received and finned commercial H-ZSM-5 under the same reaction conditions.
Figure 4:
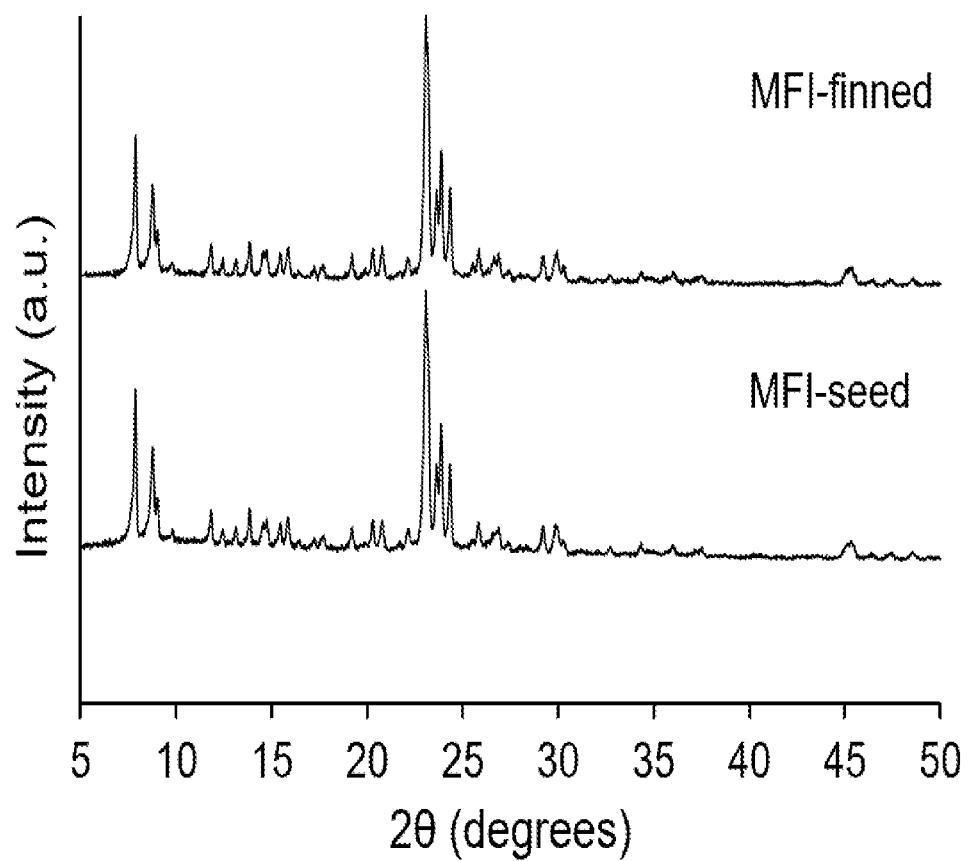
FIG. 4 shows that H-ZSM-5 samples (seed and finned) are fully crystalline, as confirmed by powder X-ray diffraction (XRD).
Figure 5:
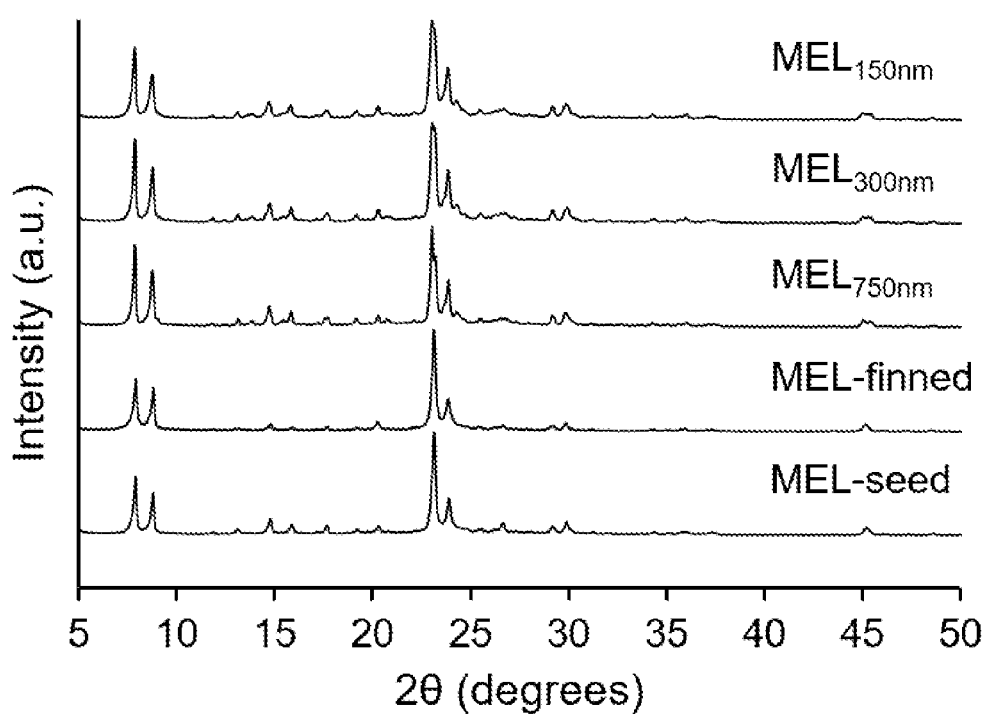
FIG. 5 shows all H-ZSM-11 samples from FIG. 1C (with the addition of the seed used to prepared the finned sample), which are fully crystalline based on their powder X-ray diffraction (XRD) patterns.
Figure 6:
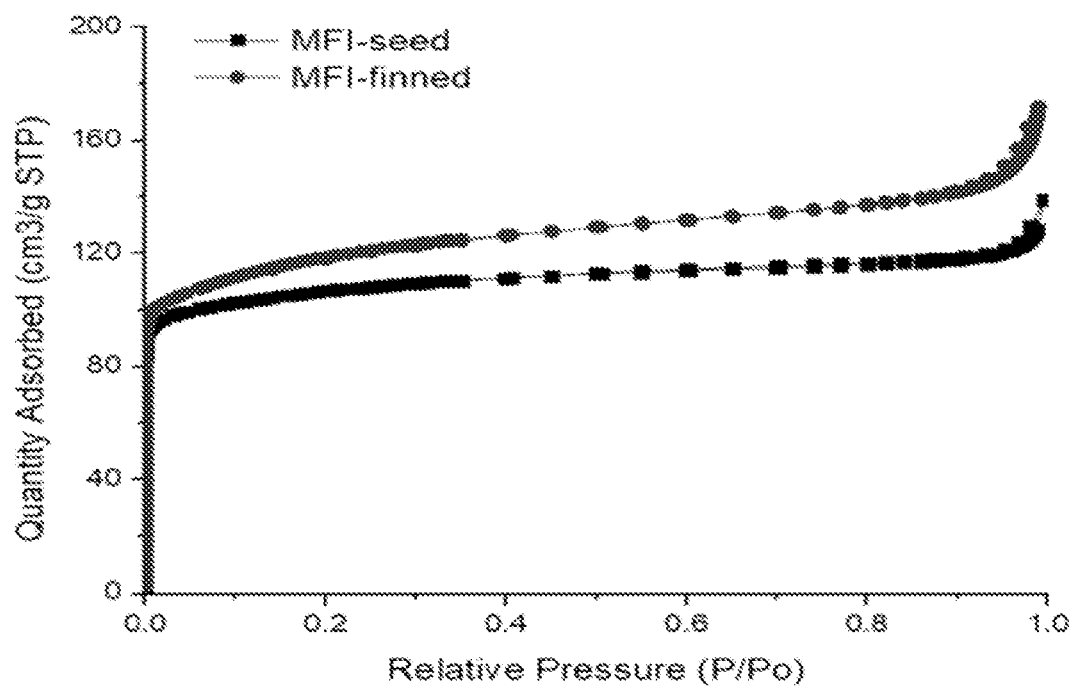
FIG. 6 shows the $N_2$ adsorption/desorption isotherms of ZSM-5 seed and finned samples.
Figure 7:
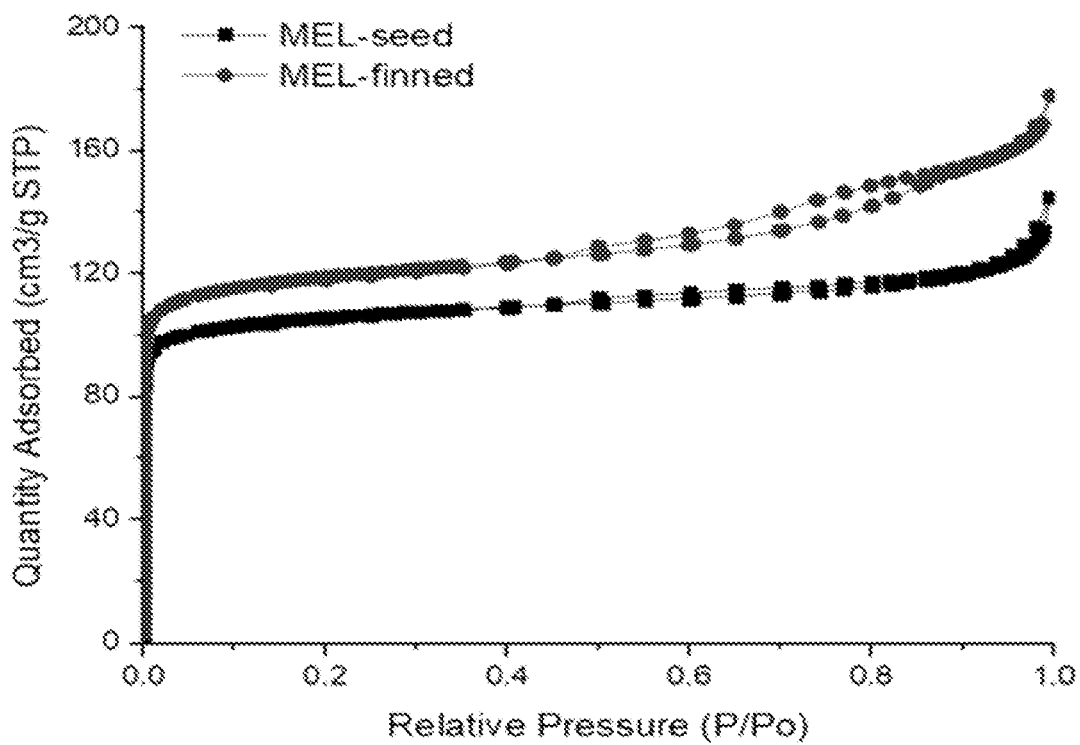
FIG. 7 shows the $N_2$ adsorption/desorption isotherms of ZSM-11 seed and finned samples.

The performance of acid-exchanged (H-form) seed and finned samples was also assessed in the MTH reaction at sub-complete methanol conversion (60-90%) to compare the relative rates of catalyst deactivation and product selectivities. The physicochemical properties of all catalysts were evaluated to confirm their similarity in acid site density to ensure a fixed weight hourly space velocity (WHSV) for each reaction run. FIGS. 3A and 3B show time-on-stream plots of sub-complete methanol conversion for H-ZSM-11 and H-ZSM-5 catalysts, respectively, for seeds (squares) and finned (diamonds) samples during the MTH reaction at 350° C. with WHSV=20 h$^{-1}$. Insets show schematics of the MEL and MFI framework topologies, respectively. Time-on-stream (TOS) analysis revealed nearly identical starting conversion, which is indicative of similar catalyst activity. This suggests that reactions in finned samples are not solely restricted to the exterior protrusions (fins), but also occur within the interior of the catalyst. This is qualitatively consistent with TEM and textural analyses showing the epitaxial growth of fins without noticeable obstruction of pores at the fin-seed boundary. In both sets of materials, an approximate 3-fold reduction in the rate of catalyst deactivation was observed; therefore, the presence of fins markedly extends the lifetime of the catalyst. FIGS. 3C and 3D show selectivities of hydrocarbon products for seed and finned H-ZSM-11 and H-ZSM-5 samples, respectively (assessed at a methanol conversion of 60-90%). Comparison of product selectivities reveals a subtle shift whereby finned zeolites, which seemingly behave as smaller crystals, promote the olefin-based cycle of the MTH hydrocarbon pool (HCP) mechanism. Prior studies have shown a progressive shift in the preferred cycle (from aromatic to olefin) with decreasing crystal size. This is clearly evident when comparing the conventional descriptor ethylene/2MBu, which is a ratio of signature products from the aromatic-based cycle (ethylene) and olefin-based cycle (2MBu=2-methylbutane and 2-methyl-2-butene). FIG. 3E shows the ratio of ethylene to 2-methylbutane and 2-methyl butene products (2MBu) for the four sets of samples. Over the entire range of methanol conversion a noticeable reduction in the ethylene/2MBu ratio of finned catalysts was observed, which agrees with the trend expected for smaller particles.

One advantage of the finned synthesis approach is that it is theoretically applicable to a wide range of framework types. Moreover, this approach can be used to upgrade commercial catalysts via the addition of a secondary growth step to produce fins with enhanced mass transport properties. A seeded growth experiment was performed using a commercial ZSM-5 sample (Zeolyst International, CBV5524G, Si/Al=25). SEM images of as-received H-ZSM-5 reveal a heterogeneous particle size distribution with dimensions spanning from 150 to 350 nm (FIG. 3F). Secondary growth of these particles successfully generated finned H-ZSM-5 without changes in the density of Brnsted acid sites. FIG. 3G shows a SEM image of a finned H-ZSM-5 sample prepared by secondary growth of the commercial sample. MTH reactions at sub-complete methanol conversion over commercial seed and finned catalysts reveal that the latter exhibits reduction in the rate of deactivation, similar to the results of synthetic H-ZSM-5 samples (FIG. 3H).

EXAMPLE 2

Ferrierite (FER type) is a 2-dimensional zeolite consisting of 10 membered-ring (MR) channels (0.43 nm×0.55 nm) running parallel to the [001] direction and intersected by 8 MR channels (0.35 nm×0.48 nm) in the [010] direction. The ferrierite cage located at the intersection of 6 MR channels and 8 MR channels is often associated with its role in catalysis. In this disclosure, a synthetic approach to producing finned ferrierite crystals is described. The application of this approach to ferrierite provides evidence that this approach is not limited to 3-dimensional zeolite frameworks (MFI and MEL types), but can be extended to zeolite frameworks with lower pore dimensions.

Figure 8:
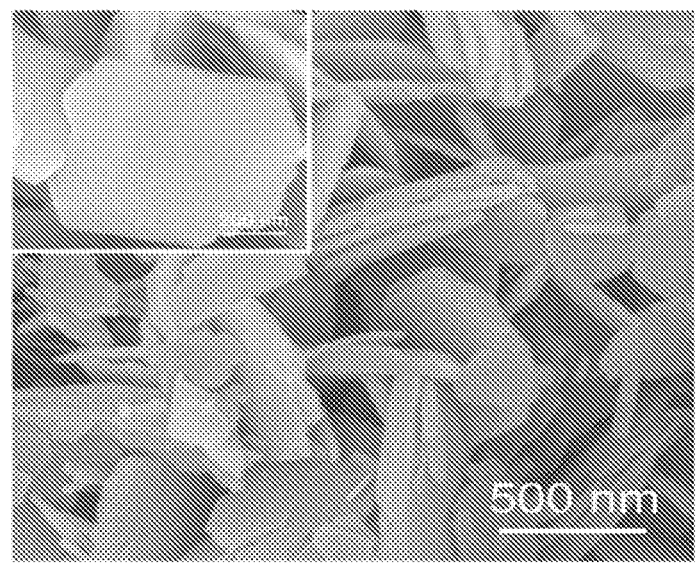
FIG. 8 shows a scanning electron micrograph of ferrierite crystals used as seeds (denoted as FER-seed).

Ferrierite seed crystals (FER-seed) were first synthesized from a conventional protocol. FIG. 8 shows electron micrograph of ferrierite crystals used as seeds (FER-seed) prepared by a conventional protocol. These seed crystals have relatively smooth surfaces, i.e. devoid of notable protrusions.

By controlling appropriate synthetic conditions, the finned ferrierite materials were generated with different protrusion (fin) sizes ranging from 40 to 80 nm. These finned materials were prepared under different synthesis conditions, including the organic structure-directing agent cyclohexylamine (CHA). The ferrierite seed was hydrothermally synthesized with a molar composition of 4.8 NaOH: 1.0 $Al_2O_3$: 20 $SiO_2$: 5.0 CHA: 1.2 KOH: 750 $H_2O$. In a typical synthesis, 7.22 g of silica source, colloidal silica, was added to a mixture of a sodium aluminate solution (15.1 wt % $Na_2O$, 16.8 wt % $Al_2O_3$) and 15.49 g of DI $H_2O$. To this solution was added 0.05 g NaOH solution (10 wt %) and 0.24 g KOH (50 wt % solution), followed by CHA (0.90 g). The resulting mixture was stirred at room temperature to get a homogenous solution. The gel solution was placed in a 60 mL Teflon liner within a metal autoclave (Parr Instruments) that was sealed and heated in a Thermo Fisher Precision oven at 165° C. and autogenous pressure. The autoclave was removed from the oven after 2 days of synthesis and was quenched to room temperature. For secondary growth of ferrierite seeds, a solution was prepared with a molar composition of 6.2 $Na_2O$: 0.71 $Al_2O_3$: 20 $SiO_2$: 14 Pyr: 800 $H_2O$. The solution was prepared by mixing approximate amounts of $Al_2(SO_4)_3 \cdot 18H_2O$ and water, followed by silica and hydroxide addition. At last, the organic structure-directing agent pyrrolidine (Pyr) was added to the solution. The resulting mixture was stirred at room temperature for 3 h. Then, 20 wt % of ferrierite (wet as synthesized seed) was added to the solution for secondary growth. The suspension was placed in Teflon liner within an autoclave and heated for 24 h at different temperatures (120 to 140° C.) and then quenched in water to room temperature. The solution was then removed from the oven and the solid was dried in air after multiple centrifuge/washing cycles.

Figure 9:
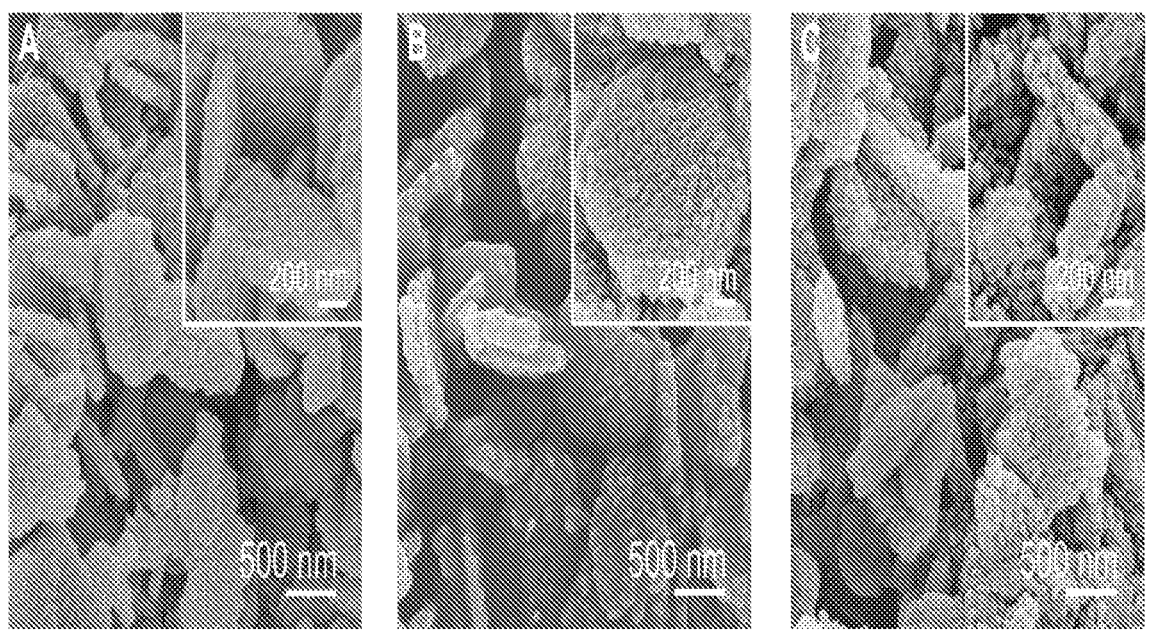
FIG. 9 shows scanning electron micrographs of finned ferrierite crystals prepared by secondary growth of the seeds under different synthesis temperatures: (A) FER-fin at T=120° C., (B) FER-fin$_2$ at T=130° C., and (C) FER-fin$_3$ at T=140° C.
Figure 10:
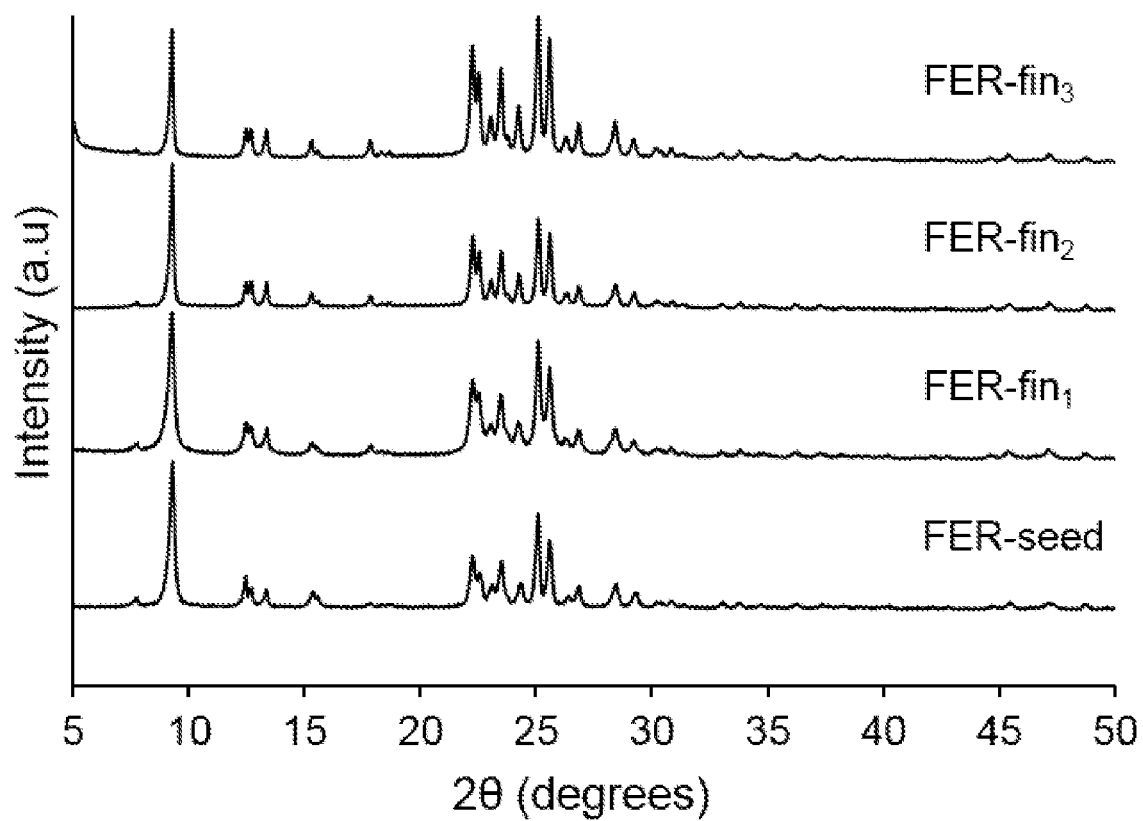
FIG. 10 shows the powder X-ray diffraction (XRD) patterns of seed and finned ferrierite samples shown in FIG. 9.
Figure 11:
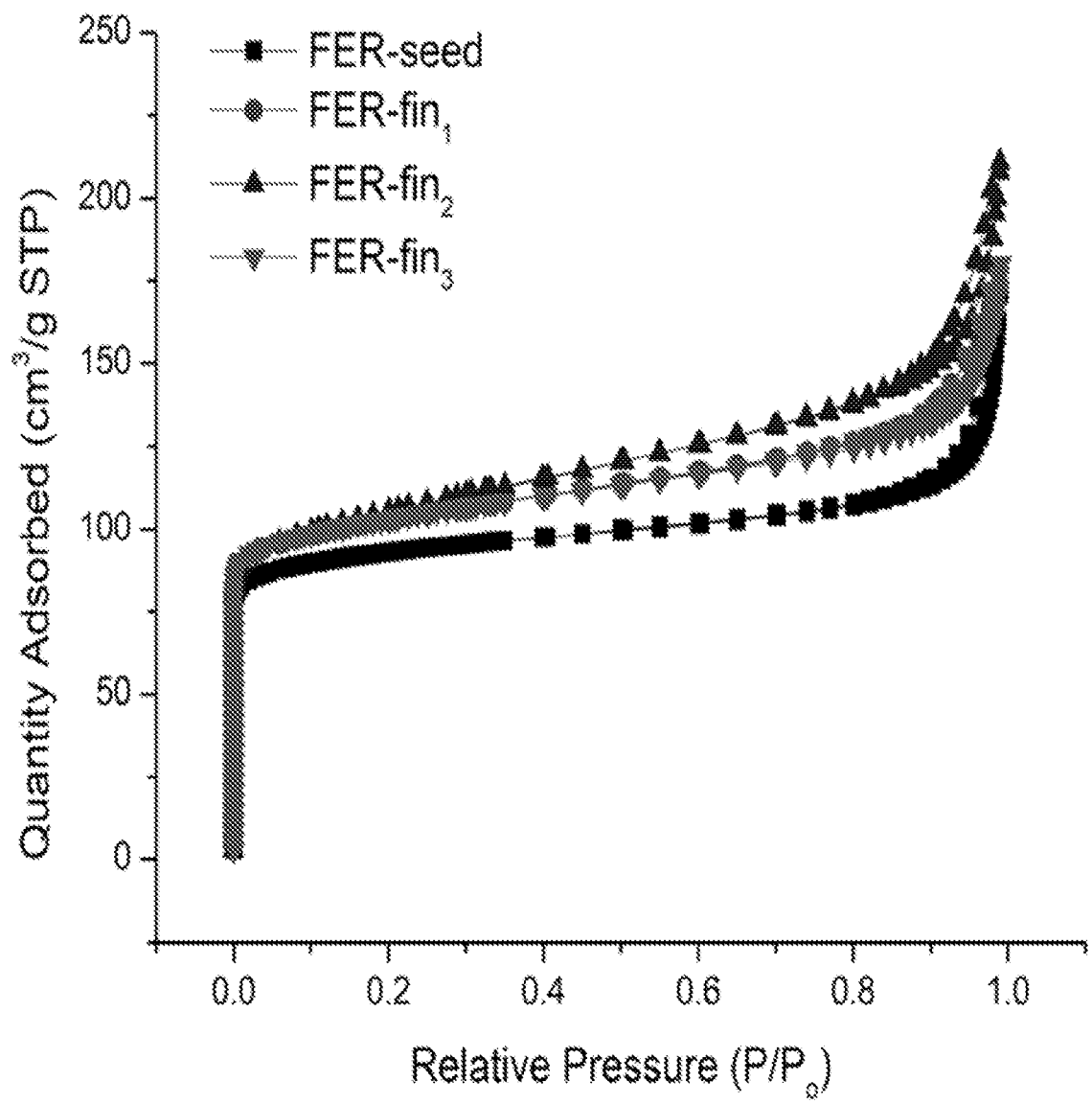
FIG. 11 shows $N_2$ adsorption/desorption isotherms for seed and finned ferrierite crystals prepared by secondary growth.

FIG. 9 shows electron micrographs of finned ferrierite crystals prepared by secondary growth of the seeds under different synthesis temperatures: (A) FER-fin$_1$ at T=120° C., (B) FER-fin$_1$ at T=130° C., and (C) FER-fin$_3$ at T=140° C. FIG. 10 shows powder X-ray diffraction (XRD) patterns of seed and finned ferrierite samples. These powder XRD patterns confirm the samples are fully crystalline without noticeable impurity before and after seeded growth. FIG. 11 shows liquid $N_2$ adsorption/desorption isotherms for seed and finned ferrierite crystals prepared by secondary growth. This textural analysis shows a slight increase in total surface area with secondary growth without sacrificing micropore volume.

What is claimed is:

1. A method for preparing finned zeolite crystals, comprising:
    preparing a secondary growth solution for epitaxial growth of finned protrusions from zeolite seed crystals, wherein the secondary growth solution comprises framework source precursors, one or more structure-directing agents, and a hydroxide source, wherein the framework source precursors comprise a silica source and an alumina source;
    adding the zeolite seed crystals in an amount of about 5 to about 30 weight percent of the secondary growth solution to produce a seeded growth solution for post-synthesis modification of the zeolite seed crystals;
    heating the seeded growth solution to a temperature of about 100° C. to about 170° C. for about 6 to about 48 hours, to produce epitaxially grown fins on the zeolite seed crystals in the seeded growth solution;
    quenching the seeded growth solution to room temperature to produce a final growth solution; and
    isolating finned zeolite crystals from the final growth solution, wherein the finned zeolite crystals comprise a zeolite seed crystal portion and a plurality of epitaxially grown fins extending from outer surfaces of the zeolite seed crystal portion, wherein the zeolite seed crystal portion comprises the zeolite seed crystals from the seeded growth solution, wherein the zeolite seed crystal portion has a characteristic size of β, wherein the epitaxially grown fins have a characteristic size of α, wherein β is greater than α, wherein a is less than about 50 nm, wherein the zeolite seed crystal portion comprises a single crystallographic registry, wherein the zeolite seed crystal portion comprises a network of pores, wherein the epitaxially grown fins comprise a single crystallographic registry that is identical to the single crystallographic registry of the zeolite seed crystal portion, and wherein the epitaxially grown fins comprise a network of pores that is continuous with the network of pores of the zeolite seed crystal portion.

2. The method of claim 1, wherein the framework source precursors comprise sodium silicate, tetraethylorthosilicate, colloidal silicate, fumed silica, $SiO_2$, aluminum sulfate, aluminum hydroxide, $Al_2O_3$, or combinations thereof.

3. The method of claim 1, wherein the one or more structure-directing agents are inorganic, organic, or a combination thereof.

4. The method of claim 1, wherein the one or more structure-directing agents are selected from pyrrolidine, tetrapropylammonium hydroxide, 1,8-diaminooctane, cyclohexylamine and tetrabutylammonium hydroxide.

5. The method of claim 1, wherein the hydroxide source is $Na_2O$ or $K_2O$.

6. The method of claim 1, wherein the secondary growth solution has a molar composition ratio of a first framework source precursor to a second framework source precursor of about 40:1 to about 120:1, and wherein the first framework source precursor is $SiO_2$ and the second framework source precursor is $Al_2O_3$.

7. The method of claim 1, wherein the secondary growth solution has a molar composition ratio of the framework source percursors to the one or more structure-directing agents of about 2:1 to about 15:1.

8. The method of claim 1, wherein the secondary growth solution has a molar composition ratio of the framework source percursors to the hydroxide source of about 8:1 to about 65:1.

9. The method of claim 1, wherein the finned zeolite crystals are MEL type, MFI type, or FER type.

10. The finned zeolite crystals prepared by the method of claim 1.

* * * * *